Figures 1, 2:
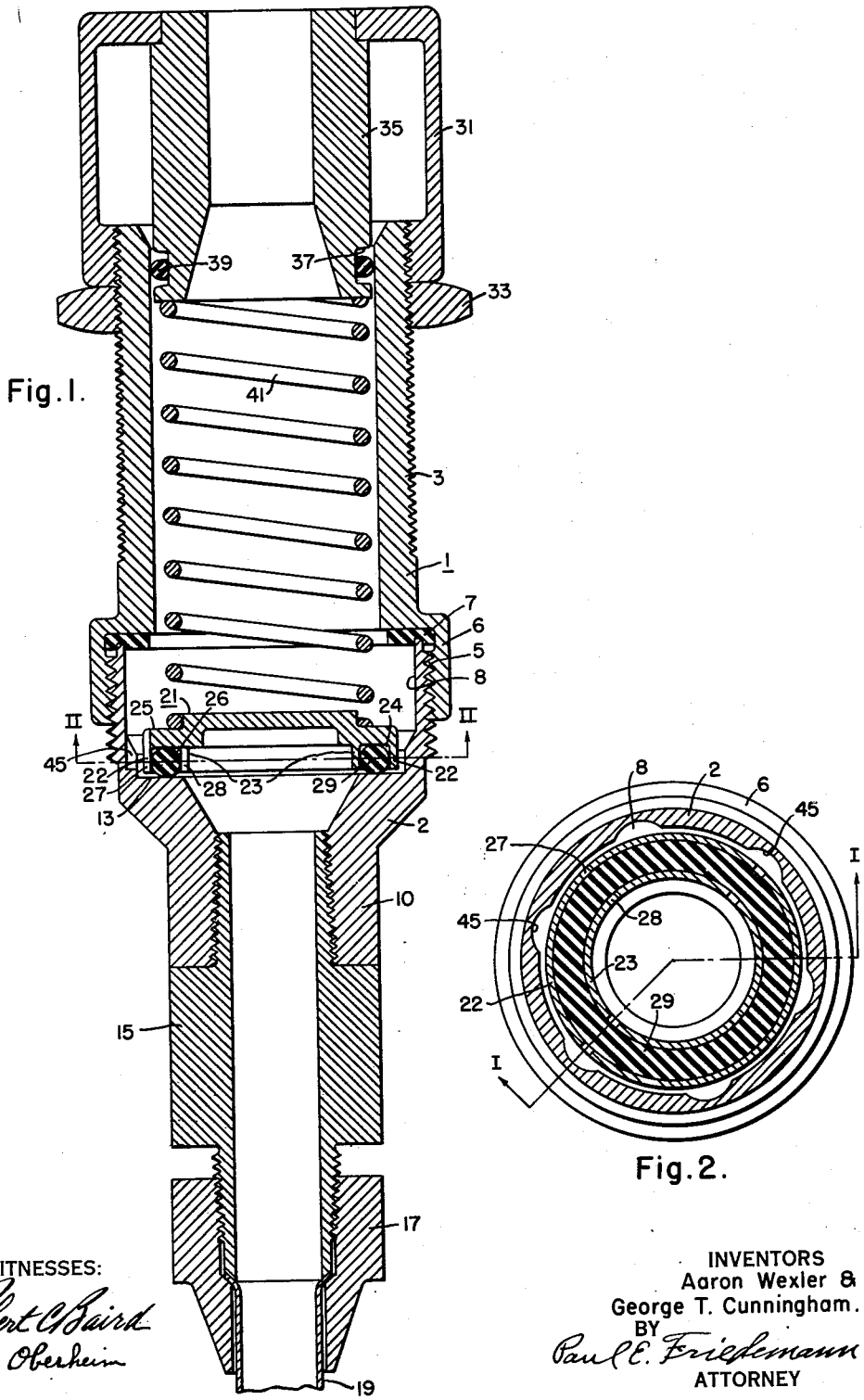

INVENTORS
Aaron Wexler &
George T. Cunningham.
BY
ATTORNEY

Patented Oct. 20, 1953

2,655,936

UNITED STATES PATENT OFFICE 2,655,936

VALVE ASSEMBLY

Aaron Wexler, Pittsburgh, and George T. Cunningham, Greensburg, Pa., assignors to Westinghouse Electric Corporation, East Pittsburgh, Pa., a corporation of Pennsylvania Application February 21, 1950, Serial No. 145,533

8 Claims. (Cl. 137—540)

This invention relates generally to fluid pressure responsive devices, and more in particular to a pressure regulating and relief valve.

In the application of pressure regulating and relief valves in low pressure systems, for example transfer systems for low boiling point liquids, containers for low boiling point liquids and for high vacuum systems, difficulty is frequently encountered in obtaining satisfactory operation. In such applications the valves normally leak badly due to improper valve design and the small closing forces which must be used. Frequently the gas flow rate per unit pressure differential above opening pressure is inadequate.

Accordingly, one object of this invention is to provide a valve of the character referred to which is simple in its elements and positive in operation.

Another object of this invention is to provide a valve of the type referred to which provides a positive seal when closed.

A further object of this invention is to provide a valve of the character mentioned which has a small pressure differential between opening and closing pressures.

The foregoing statements are merely illustrative of the various aims and objects of this invention.

Other objects and advantages will become apparent from the following specification, when considered in conjunction with the drawing, in which:

Figure 1 is a longitudinal cross section taken along the line I—I of Fig. 2 and illustrating a valve assembly embodying the principles of this invention; and Fig. 2 is a cross sectional view of the embodiment of Fig. 1 taken on the line II—II of Fig. 1.

In Fig. 1 the valve assembly comprises a body section generally designated 1. This body section is comprised of two parts, including the valve chamber housing 2 and the upper section 3 as viewed. These two parts are threadedly joined by means of the threads 5 which are formed externally of the valve chamber housing and which receive the externally threaded section 6 of the upper housing section 3. A gas tight joint is afforded between these two components by a washer 7 which seats upon a shoulder in the upper section 3 and abuts the extremity of the valve chamber 8 of the chamber housing 2. The upper end of the upper housing section 3 is open to the atmosphere. The valve chamber housing 2 terminates in an internally threaded section 10 which forms an inlet port into the valve chamber 8. This inlet port where it opens into the valve chamber 8 is flared outwardly to provide a large opening into the valve chamber, and a valve seat 13 is formed in the bottom of the valve chamber about this inlet port.

The threaded section 10 of the valve chamber housing may be of any suitable configuration to adapt its connection to a particular system. As illustrated, an adapter fitting 15 is connected thereto having provision at its bottom end to receive a flare fitting 17 for the purpose of connecting a flexible tube 19 to the inlet port.

The inlet port is sealed over in the valve chamber by means of a valve member generally designated 21. This valve member is of substantially circular plan form and is provided with a pair of radially spaced axially projecting thin wall sections 22 and 23, respectively, designating the outer and inner wall sections illustrated. These wall sections define an annular recess 24 adjacent the outer circular edge of the valve member 21, which annular recess is of substantially rectangular cross-sectional configuration defining corners 25 and 26 between the recess inner walls and the bottom of the annular recess. The bottom of this recess is vented by the provision of a plurality of slots 27 and 28 which extend transversely of the thin wall sections of the annular recess to the bottom thereof. Any number of these slots as required may be provided in the wall sections 22 and 23, four being illustrated in the sectional view of Fig. 2. A ring 29 of resilient material and of circular cross section is secured in the annular recess. This ring is of sufficient diameter in cross section to be snugly received within the side walls of the annular recess, thereby having essentially line contact with the side walls thereof and with the bottom thereof. Thus it will be appreciated, and this detail is illustrated in Fig. 1, that the areas adjacent the corners defined at each side of the bottom of the annular recess are not filled by the ring 29, leaving a space therein which is vented by the slots 27 and 28. The ring 29 projects a sufficient distance from the annular recess in which it is secured to seat upon the valve seat 13 about the inlet port, thereby sealing the inlet port from the valve chamber.

By venting the bottom of the annular recess, the possibility of distortion of the seating line of the sealing ring 29 from a plane surface is minimized. For instance, in the absence of slots, such as 27 and 28, it is possible for gas to be forced past the ring 29 into the bottom of the annular recess, lifting the ring from contact with the bottom and accordingly displacing the outer or seating edge of the ring and distorting the valve surface. Thus a positive seal of the inlet port would be destroyed, due to the distortion of the seating surface of the ring. However, by utilizing the venting arrangement herein provided, any gas which is forced past the ring 29 into the bottom of the annular recess flows through the areas adjacent the corners at the bottom of the recess to one of the slots 27 or 28, thereby obviating the possibility of the accumulation of unequal gas pressure back of the ring 29.

Valve member 21 is positively seated on the valve seat 13 by means of a compression spring assembly which includes a cap 31 threaded over the externally threaded portion of the upper housing section 3. This cap is locked in any predetermined position by means of a lock nut 33 which also threads over the same threaded section of the upper housing. Cap 31 is provided with an opening therethrough in which is securely fitted a tubular section 35 which projects into the upper housing section 3. This tubular section is provided with an external circumferential recess 37 which receives an annular ring 39 of resilient material which is of sufficient diameter in cross-section to be compressed between the bottom of recess 37 and the inner wall of housing section 3. This provides a gas tight seal between the two members. A compression spring 41 is engaged between the extremity of the tubular section 35 within the housing section 3, and the back face of the valve member 21 being seated in a recess formed in the back section of the valve member to positively locate the spring with respect to the valve member. Thus by the simple expedient of rotating the cap 31 with the lock nut 33 disengaged from the cap 31, it is possible to vary the longitudinal position of tubular section 35 and thereby vary the degree of compression and hence the force applied to valve member 21. This feature controls the opening pressure of the valve.

It will be obvious that numerous other expedients, both simpler and more complicated than that illustrated, may be utilized for adjusting the compression of the spring 41. For instance, the end of the upper housing section 3 may be closed over to form a shoulder therein against which the upper end of the spring 41 may seat. Compression of the spring would then be applied entirely by threading the upper and lower housing sections 3 and 2, respectively, together. Variations in the pressure applied to the valve 21 may be accomplished by inserting spacing washers between the shoulder at the upper end of housing section 3 and the spring 41. Other similar simple expedients may be employed.

While it is not to be construed from the remarks herein that the present valve assembly is usable only on low pressure systems to the exclusion of high pressure systems, certain features hereof are highly essential to proper valve performance when applied to low pressure systems. One such expedient resides in the use of a large valve area which is exposed to fluid pressure through the inlet port. It is for this reason that the inlet port has been flared outwardly as indicated at its point of opening into the valve chamber, so that a relatively large valve area is exposed to the fluid pressure when the valve is closed. On low pressure systems it will be appreciated that such an expedient provides a higher total force on the valve member 21, permitting a correspondingly larger restraining force by a spring such as 41 or other resilient restraining means. Thus the performance of the valve in the critical range in the vicinity of opening pressure is improved due to the fact that forces of larger magnitude are being dealt with and reproducibility of valve opening at a predetermined pressure is more readily obtainable.

The pressure differential between opening and closing of the valve is kept small by designing the valve member so that the area exposed to gas pressure when the valve is closed, closely approaches the area exposed to gas pressure when the valve is opened. This is accomplished by positioning the annular recess in which the ring 29 is seated as closely as it is physically possible to the outer edge of the valve member. Thus the area added to the valve that is exposed to gas pressure when the valve opens is merely that from the seating line of the ring 29 to the outer edge of the valve member. With the design provided, this change in area can be kept at a minimum value, and consequently the variation between the opening and closing pressures will be at a minimum. To cite a practical example in one reduction to practice, a valve of the character herein described was arranged to have an opening pressure which was adjustable in the range of zero to 15 pounds per square inch. In this range it was found that the gas pressure at which a preset valve opened was reproducible within plus or minus ⅛ of a pound per square inch, and the differential between open position and full closure was less than ½ pound per square inch.

In furtherance of achieving the large valve area exposed to gas pressure when the valve is closed, it will be observed that full advantage of the available space within the valve chamber has been utilized to obtain just as large a valve member and small seating surface in the chamber as is feasible. In other words the inlet port is flared outwardly as much as is possible within the valve chamber while yet permitting sufficient seating surface to properly seat the valve member 21 and yet provide small clearance therefor between the outer edges of the valve member and the inner wall of the valve chamber. This latter feature also functions to minimize travel of valve member 21 laterally of the valve chamber, thereby preventing displacement of ring 29 from the area of the valve seat 13. Since the lateral clearances are small, the flow rate characteristic is improved by the provision of suitable passages 45 at circumferentially spaced points about the inner wall of the valve chamber adjacent the bottom thereof to provide for ready passage of the gas from the inlet port around the outer edges of valve member 21. A value for the flow rate of the valve is given from data obtained from tests made on one which was set to open at 7½ pounds per square inch and closed at 7 pounds per square inch. Above 7½ pounds per square inch the flow rate of the particular gas employed in the test was about 1.8 cubic feet per minute per pound per square inch pressure differential. This behavior plus the fact that the valve is helium leak detector tight when it is connected to a vacuum system with atmospheric pressure on the exhaust side of the valve gives the valve unique properties.

It will be appreciated by examination of the specifically illustrated design of valve member 21 with regard to the supporting of ring 29 in the recess and the venting of the recess that numerous variations in details of this design may be had while yet employing the principles involved therein. For example, it is not essential that the ring 29 be of circular cross section, although this is the more practical form of the ring. The ring may be elliptical in cross section, or it may be of rectangular cross section with diagonal corners of the rectangle engaging the opposite inner walls of the recess and another corner of the rectangle engaging the bottom of the recess, accomplishing exactly the same object as the illustrated ring 29. Triangular ring sections may also be employed for the same purpose, or a rectangular shape within projecting sections from the sides of the rectangle for engaging the sides and bottom of the recess is also feasible. In some applications instead of having the flat valve seat 13 in the bottom of the valve chamber, it may be desirable to have a thin axially projecting ring extending from this surface, in which case the seating surface of the ring 29 of resilient material may be flat and need not project beyond the cross sectional area defined by the annular recess. Numerous other variations in this structure will be readily apparent to those skilled in the art and mention of these need not be made.

The foregoing disclosure and the showings made in the drawings are therefore intended to be considered only as illustrative of the principles of this invention and are not to be interpreted in a limiting sense.

We claim as our invention:

1. In a valve assembly, the combination of, a valve body having a valve chamber therein and having an inlet passage into said chamber, a valve seat about said inlet passage in said chamber, a valve member of substantially circular configuration and having a circular recess in one face thereof of substantially rectangular cross-section to define corners at opposite sides of the bottom of the recess, said valve member having openings therethrough into the bottom corners of said recess for venting the bottom of said recess, a ring of resilient material secured in said circular recess, said ring being of curved cross section and making contact with the bottom of said recess along a continuous single line between said corners, said valve member being disposed in said chamber with said ring seating upon said valve seat to seal off said inlet passage, and biasing means engaging said valve member and forcing said valve member against said seat.

2. In a valve assembly, the combination of a valve body having a valve chamber therein opening through one end of said body and having an inlet passage into said chamber through the other end of said body, said inlet passage flaring outwardly into said chamber to provide a large diameter opening therein, a valve seat about said opening in said chamber, a valve member of circular configuration and having a circular recess in one face thereof of substantially rectangular cross-section to define corners at opposite sides of the bottom of the recess, said valve member having openings therethrough into the bottom corners of said recess for venting said recess, a ring of resilient material secured in said recess and projecting from the open end thereof said ring being of curved cross section and making contact with the bottom of said recess along a continuous single line between said corners, said valve member being disposed in said chamber with said ring seated upon said valve seat, said chamber at the open end thereof being threaded externally, a threaded cap fitted over the threads of said chamber, said threaded cap having an opening in the end thereof, a tubular member secured in said opening and projecting into said chamber, sealing means between the outer surfaces of said tube and the wall of said chamber, and a compression spring engaged between the end of said tube and said valve member to force said valve member against said valve seat.

3. In a valve assembly, the combination of, a valve body having a chamber therein of circular cross-section and having an inlet passage into the bottom of said chamber, a valve seat in the bottom of said chamber about said inlet passage, a valve disc of larger diameter than said inlet passage and having a circular recess in one face thereof adjacent the outer edge of said disc, said recess being of rectangular cross-section to define corners at opposite sides of the bottom thereof, said disc having openings therethrough into the corners for venting the bottom corners of said recess, a ring of resilient material secured in said recess, said ring being of curved cross section and contacting the bottom of said recess along a continuous single line between said corners, said valve member being disposed in said chamber with said ring seated upon said valve seat, and biasing means engaging said disc for forcing said ring against said valve seat.

4. A valve member comprising an element having a continuous recess in one face thereof, said recess being rectangular in cross section defining corners between the bottom and the side walls thereof, a band of resilient material of substantially circular cross section, said band of resilient material being secured in said recess in continuous single line contact with the bottom thereof between said corners and engaging the side walls thereof, the areas of the corners of said recess between said band of resilient material and the bottom of said recess being clear, said element having openings therethrough into said corners for venting said corners.

5. A valve member comprising an element having a continuous recess in one face thereof of substantially rectangular cross-section to define corners between the side walls and bottom thereof, a closed loop of resilient material of substantially circular cross-section fitted into said recess in continuous single line contact with the side walls and bottom of said recess, the areas of the corners of said recess between said loop of resilient material and the bottom of said recess being clear, said element having openings therethrough into said corners adjacent the bottom of said recess for venting said recess.

6. A valve member comprising an element having a continuous recess in one face thereof, said recess being of rectangular cross-section to define corners between the side walls and bottom thereof, a closed loop of resilient material secured in said recess, said closed loop of resilient material having a converging cross sectional configuration towards the bottom of said recess to establish continuous single line contact therewith leaving the areas of the corners of said recess clear, said element having openings therethrough into said corners for venting said recess.

7. A valve member comprising a plate of substantially circular shape and having a substantially circular recess in one face thereof adjacent the outer edge of said disc to definie a thin outer recess wall, said disc being recessed centrally thereof to define a thin inner recess wall, said circular recess being of rectangular configuration in cross-section to define corners between the side walls and bottom thereof, both of said side walls having a plurality of openings therethrough into said corners, and a closed loop of resilient material, having a substantially circular cross sectional configuration to engage the side walls of the circular recess and having continuous single line contact with the bottom thereof at a point removed from said openings, fitted into said circular recess.

8. A valve member comprising a plate of substantially circular shape having a pair of radially spaced and axially projecting thin wall sections on one face thereof, defining a circular recess of substantially rectangular cross section, said thin wall sections each having at least one slot therein transversely disposed and extending substantially to the base thereof, and a ring of resilient material of substantially circular cross section fitted into said circular recess in engagement with said side walls above the bottoms of said slots and making continuous single line contact with said bottom of said circular recess between said walls.

AARON WEXLER.
GEORGE T. CUNNINGHAM.

References Cited in the file of this patent

UNITED STATES PATENTS

| Number | Name | Date |
|---|---|---|
| 156,371 | Orr | Oct. 27, 1874 |
| 820,239 | Moss | May 8, 1906 |
| 874,652 | Bailey | Dec. 24, 1907 |
| 1,322,638 | Smolensky | Nov. 25, 1919 |
| 2,311,009 | Urquhart | Feb. 16, 1943 |
| 2,417,494 | Hoof | Mar. 18, 1947 |
| 2,524,951 | Ashton | Oct. 10, 1950 |

FOREIGN PATENTS

| Number | Country | Date |
|---|---|---|
| 11,477 | Great Britain | of 1886 |
| 12,911 | Great Britain | of 1904 |